US007519923B2

(12) United States Patent
Peterson et al.

(10) Patent No.: US 7,519,923 B2
(45) Date of Patent: Apr. 14, 2009

(54) METHOD FOR GENERATING A TREE VIEW OF ELEMENTS IN A GRAPHICAL USER INTERFACE (GUI)

(75) Inventors: Trenten Peterson, Morgan Hill, CA (US); Erik Bruce Underkofler, Austin, TX (US); Ningning Wang, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 10/970,525

(22) Filed: Oct. 20, 2004

(65) Prior Publication Data

US 2006/0085765 A1    Apr. 20, 2006

(51) Int. Cl.
*G06F 3/048* (2006.01)
(52) U.S. Cl. ........................... 715/854; 715/853
(58) Field of Classification Search .................. 715/854, 715/853
See application file for complete search history.

(56) References Cited

U.S. PATENT DOCUMENTS

| | | | | |
|---|---|---|---|---|
| 5,953,017 | A * | 9/1999 | Beach et al. | 345/440 |
| 6,754,873 | B1 * | 6/2004 | Law et al. | 715/501.1 |
| 2003/0063134 | A1 | 4/2003 | Lord et al. | |
| 2003/0197744 | A1 | 10/2003 | Irvine | |
| 2004/0070576 | A1 | 4/2004 | Sakurai et al. | |
| 2005/0257172 | A1 * | 11/2005 | Bales et al. | 715/853 |
| 2005/0289155 | A1 * | 12/2005 | Nan et al. | 707/100 |

OTHER PUBLICATIONS

Holland, Bill. RE: SIGIA-L: Index to screens of search-results. In SIGIA-L (A discussion list for the Community Infrastructure for Information Architects) [online]. Feb. 8, 2001 [retrieved on Jul. 13, 2007]. Retrieved from the Internet: <URL:http://www.info-arch.org/lists/sigia-l/0102/0209.html>.*
IBM Corporation, "User Interface Control to Customize the Expansion of a Tree View", *Research Disclosure*, RD 450146, Oct. 2001, pp. 1786-1787.

* cited by examiner

*Primary Examiner*—Kieu D Vu
*Assistant Examiner*—Stephen Alvesteffer
(74) *Attorney, Agent, or Firm*—David Victor; Konrad Raynes & Victor LLP (57) ABSTRACT

Provided is a method, for generating a tree view of elements in a graphical user interface (GUI). Hierarchical information is processed including information on elements at different hierarchical levels. A tree view is generated in response to processing the hierarchical information enabled to be displayed in a graphical user interface (GUI) including graphical indicators representing elements at different hierarchical levels. In the tree view for at least one hierarchical level, graphical indicators for a subset of the elements at the hierarchical level and a graphical paging control enabling user selection of one of a plurality subset of elements at the hierarchical level are generated. In the tree view, graphical indicators representing elements in a selected subset of elements at one hierarchical level are generated in response to selection of the selected subset through the graphical paging control.

11 Claims, 7 Drawing Sheets

METHOD FOR GENERATING A TREE VIEW OF ELEMENTS IN A GRAPHICAL USER INTERFACE (GUI)

BACKGROUND OF THE INVENTION

1. Field of the Invention

The present invention relates to a method, system, and program for generating a tree view of elements in a graphical user interface (GUI).

2. Description of the Related Art

A computer user may display in a graphical user interface (GUI) a tree view of objects in a hierarchical relationship, such as files in a hierarchical file system. The tree view may display folders representing groupings of objects at different hierarchical levels. Typically, when a user selects a folder, the GUI will display a list of all objects included in the selected folder/group. The list may extend off the viewable portion of the page, requiring the user to scroll down the page to view objects in the selected folder that are not currently displayed on the page or look at folders and objects following the selected folder. If the selected folder includes numerous objects, then the user may have scroll through numerous displayed objects in the selected folder until a desired object is located.

SUMMARY

Provided are a method, system, and program for generating a tree view of elements in a graphical user interface (GUI). Hierarchical information is processed including information on elements at different hierarchical levels. A tree view is generated in response to processing the hierarchical information enabled to be displayed in a graphical user interface (GUI) including graphical indicators representing elements at different hierarchical levels. In the tree view for at least one hierarchical level, graphical indicators for a subset of the elements at the hierarchical level and a graphical paging control enabling user selection of one of a plurality subset of elements at the hierarchical level are generated. In the tree view, graphical indicators representing elements in a selected subset of elements at one hierarchical level are generated in response to selection of the selected subset through the graphical paging control.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
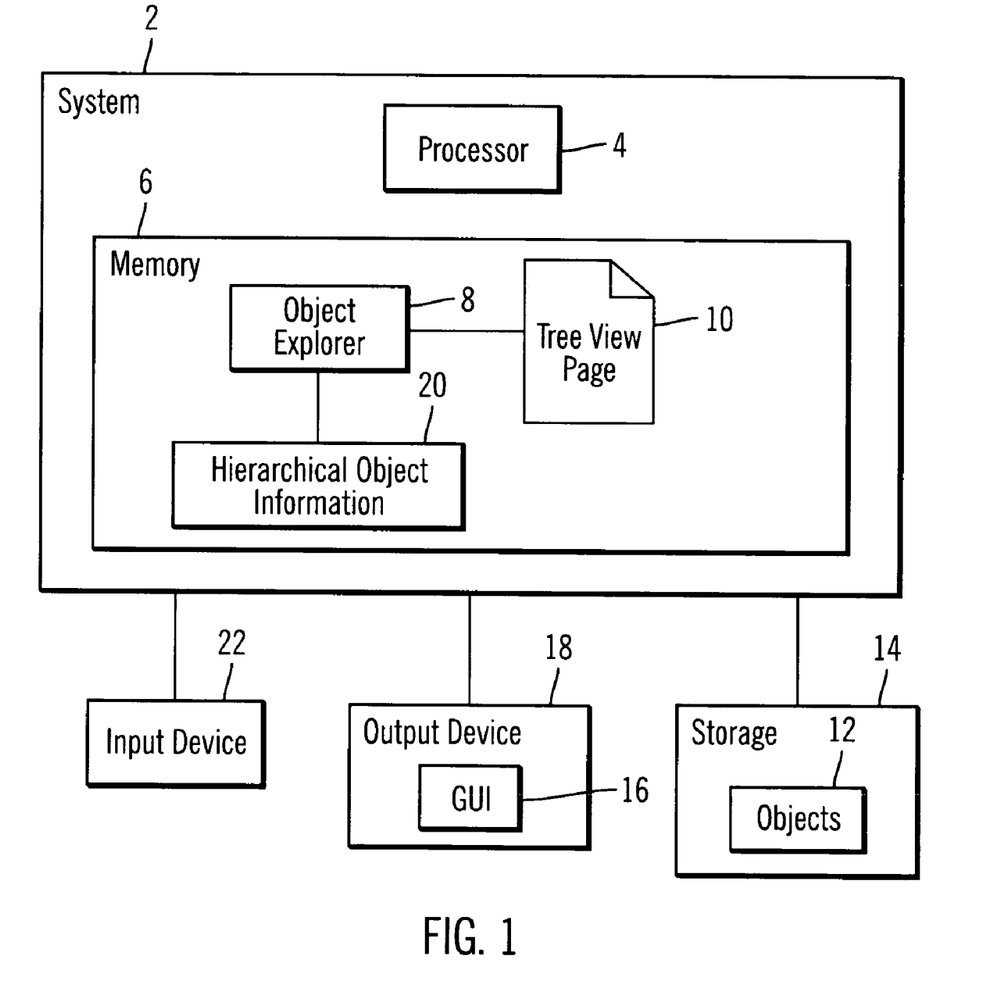
FIG. 1 illustrates an embodiment of a computing environment.

FIG. 1 illustrates a computing environment comprising a computer system 2 having a processor 4 and memory 6. The processor 4 executes an object explorer 8 program that generates a tree view page 10 providing a hierarchical tree view of objects 12 in a storage device 14. The tree view page 10 may be presented in a graphical user interface (GUI) 16 rendered on an output device 18 coupled to the system 2, such as a monitor. The object explorer 8 processes hierarchical object information 20 that maintains information on the objects 14 and their hierarchical relationship to generate the tree view page 10. The tree view page 10 may comprise a structured document, such as a document encoded in Hypertext Markup Language (HTML), Extended Markup Language (XML), etc., or other page formats.

The system 2 is coupled to an input device 22, such as a mouse, pen-pointer, touch sensitive display screen, keyboard, voice activated input, etc., that enables a user to provide input to the system, such as input to traverse and select objects represented in the tree view page 10 presented in the GUI 16. The output device 18 coupled to the system 2 may comprise a computer monitor. The storage 14 coupled to the system 2 may comprise an internal or external storage device, e.g., hard disk drive, electronic memory, tape, optical storage, etc., directly coupled to the system 2 or comprise storage the system 2 communicates with over a network. The memory 6 may comprise a volatile memory device. Objects 12 may be loaded into the memory 6 when they are selected by a user of the system 2 in the tree view page 10 in the GUI 16 using the input device 22.

The objects 12 may comprise files, cataloged items, records, or other data structures. The hierarchical object information 20 may include groupings of objects, such as folders, that organize the objects 12 at different hierarchical levels, such as folders that organize files at different hierarchical levels in a hierarchical file system.

Figure 2:
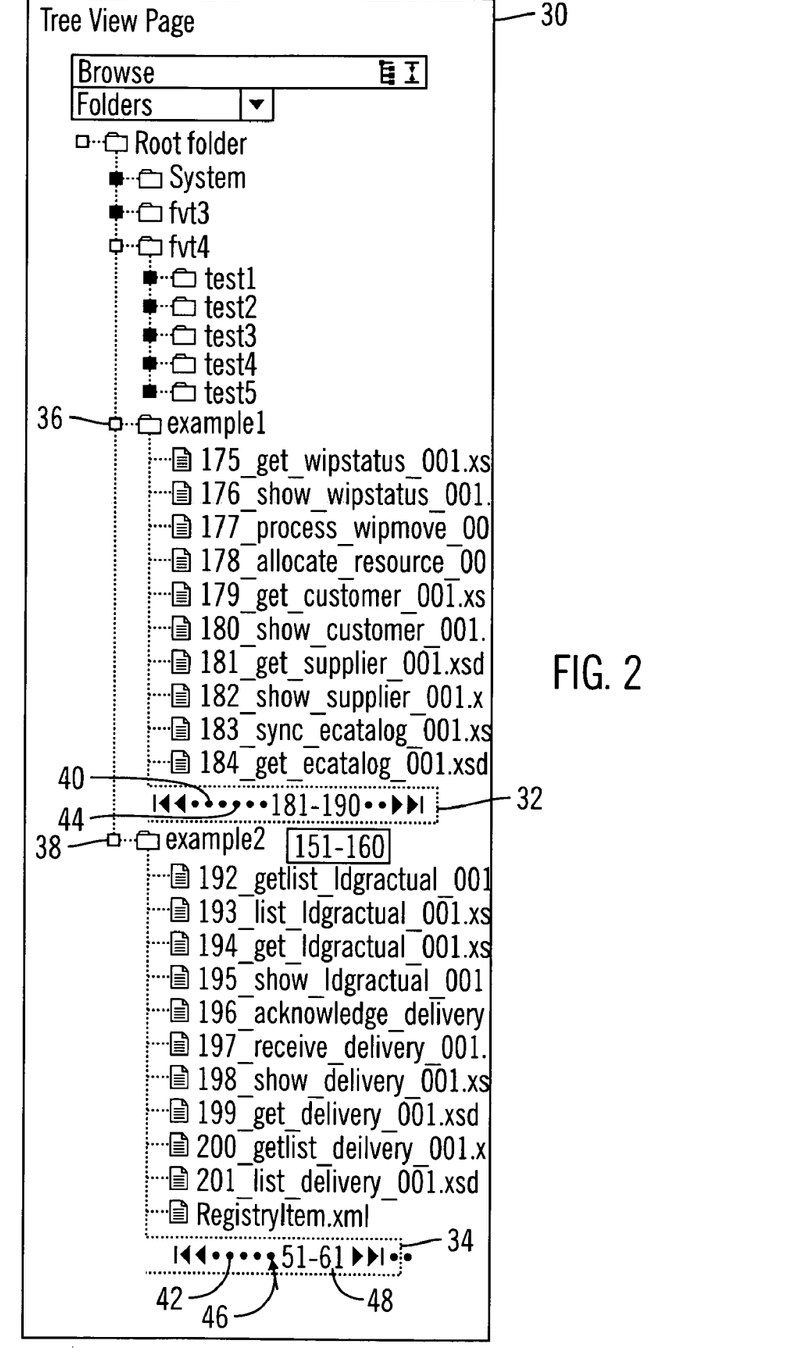
FIGS. 2 and 3 illustrate examples of embodiments of a tree view displayed in a GUI.

FIG. 2 illustrates one example of an embodiment of a tree view page 30 presented in the GUI 16. The tree view page 30 displays graphical page controls 32 and 34 for folders 36 and 38 that each include more than some fixed number of objects, such as ten objects. The graphical page controls 32, 34 include selectable dot graphics (bullets), e.g., 40, 42, where each dot graphic represents a range of the objects at the hierarchical level represented by the folders 36, 38. Each range represented by a selectable graphical dot, e.g., 40, 42, may group objects according to some attribute of the object, such as name, date, type, data in the object, etc. If there are less than the fixed number of objects that may be displayed in a selected range represented by a selectable graphical dot, then the tree view may display objects in adjacent ranges. For instance, the selected dot 44 for folder 36 represents a range of objects "181-190". However, objects outside of this range in adjacent ranges are displayed if there are less than the fixed number, e.g., 10, of objects that may be displayed in the selected range 44. Further, if the user moves a graphical pointer 46 over a dot whose subset is not currently not displayed, then text 48 may appear providing information on the grouping of objects, 56-61, represented by that dot over which a graphical pointer 46 is positioned.

Figure 3:
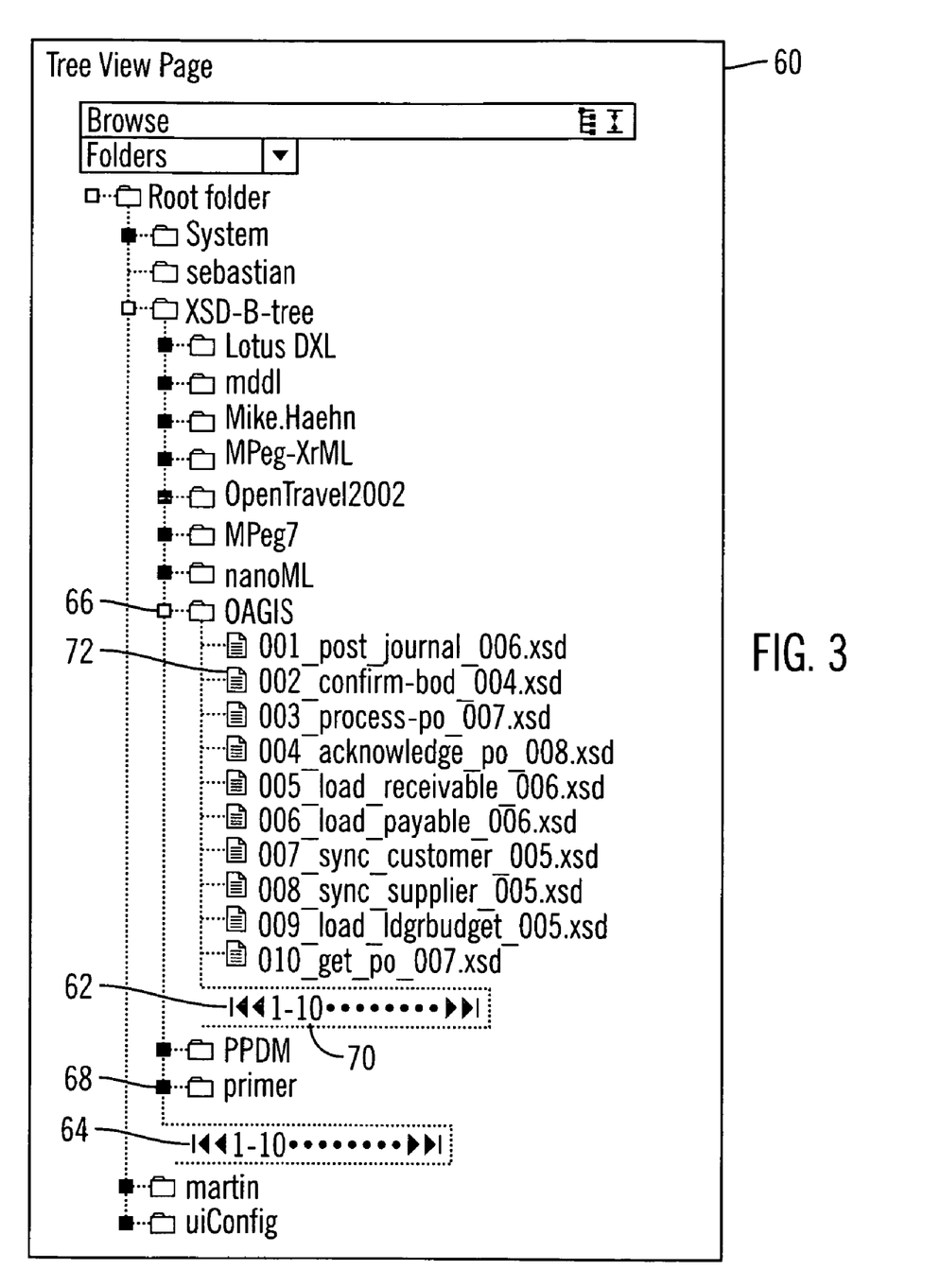

FIG. 3 provides an example of a tree view page 60 having graphical paging controls 62, 64 enabling selection of a subset of objects grouped within folders 66 and 68 to display. If there are no objects in the range of criteria represented by a selected dot, then no objects may be displayed for that folder, e.g., 68.

Figure 4:
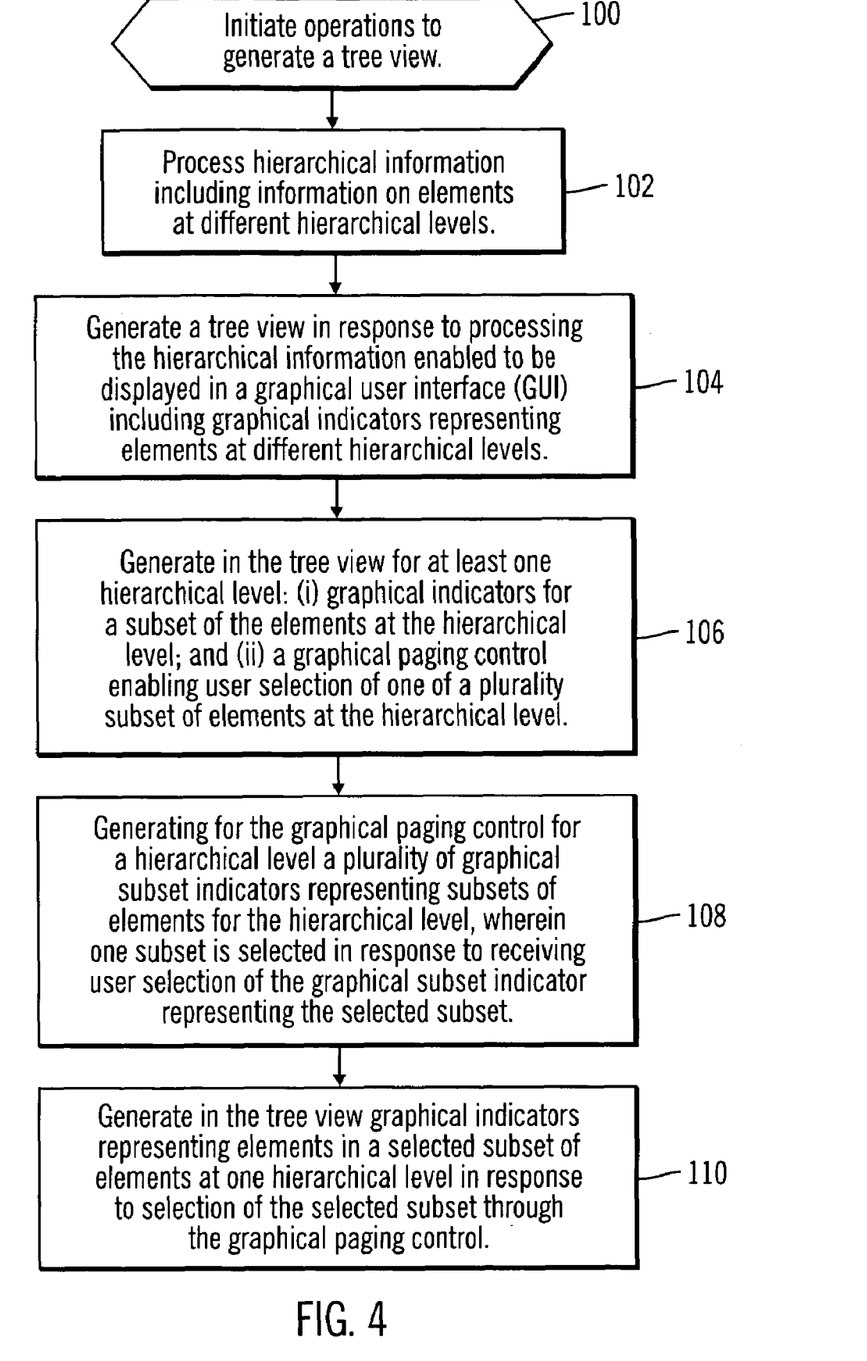
FIGS. 4 and 5 illustrate an embodiment of operations to generate and use a tree view.

When displaying different ranges of objects using the graphical paging controls shown in FIGS. 3 and 4, the display of all other folders and objects in the tree view page 30, 60 may not be not affected and remain unchanged when changing the subset of objects grouped in a folder by selecting a different selectable dot in the graphical paging control. In one embodiment, only objects represented in the displayed tree view page are loaded into the memory 6 from the storage 14. Thus, when changing the display of a subset of objects by selecting a subset using the graphical paging control, the object explorer 8 may load the newly displayed objects in the range into the memory 6.

FIG. 4 illustrates operations performed by the object explorer 8 to generate a tree view page 10 to display in the GUI 16. Upon initiating (at block 100) operations to generate a tree view page 10, the object explorer 8 processes (at block 102) hierarchical information 20 including information on elements at different hierarchical levels. The elements may comprise groups and objects, wherein groups and objects at one hierarchical level below a first hierarchical level, such as the root level, are included within one group at a higher hierarchical level. The groups may be represented by a folder icon, e.g., 36 and 38 (FIG. 2). In this way, the groups represent different hierarchical levels in which objects may be arranged. Objects may be represented by document icons, e.g. document icon 72 in FIG. 3. The element objects may comprise files or other data structures that the user may select to view, update, etc. The object explorer 8 generates (at block 104) a tree view 10 in response to processing the hierarchical information 20 that is enabled to be displayed in a GUI 16 including graphical indicators representing elements at different hierarchical levels. The graphical indicators may comprise the icons representing the objects and folders.

The object explorer 8 further generates (at block 106) in the tree view 10 for at least one hierarchical level graphical indicators for a subset of the elements at the hierarchical level and a graphical paging control, e.g., 32, 34 (FIG. 2), enabling user selection of one of a plurality subset of elements at the hierarchical level. In one embodiment, such as shown in FIGS. 2 and 3, the graphical paging control is displayed within hierarchical level in the tree view for which the graphical paging control is generated and the graphical subset indicators comprise selectable dots displayed within the paging control. A plurality of graphical subset indicators, such as the dots, e.g., 40, 42 (FIG. 2) displayed in the graphical paging controls 32, 34, are generated (at block 108) for the graphical paging control for a hierarchical level representing subsets of elements for the hierarchical level. One subset is selected in response to receiving user selection of the graphical subset indicator representing the selected subset communicated from the input device 22. The object explorer 8 further generates (at block 110) in the tree view 10 graphical indicators representing elements in a selected subset of elements at one hierarchical level in response to selection of the selected subset through the graphical paging control. The graphical elements may comprise the folders or document icons representing the elements in the selected subset presented in the tree view page 10.

In one embodiment, such as shown in FIGS. 2 and 3, generating the graphical indicators representing elements in the selected subset causes the display in the GUI 16 of graphical indicators representing elements, such as icons, in the selected subset and not elements in other subsets at the hierarchical level including the selected subset. Further, in one embodiment, generating the graphical indicators for the selected subset for display in the GUI does not affect the display in the GUI of graphical indicators representing elements displayed at hierarchical levels other than the hierarchical level including the selected subset. Still further, in certain embodiments, the user does not have to scroll through multiple pages of objects if a selected group/folder has numerous objects to locate a specific object. Instead, the user uses the graphical paging control to select a specific range of objects including the desired object, leaving other folders and objects continually displayed and unchanged in their displayed position while locating a specific object in a folder.

In one embodiment, the graphical paging control is generated if the number of objects in a selected group/folder exceeds some fixed number. The objects may be divided into subsets of elements, each having a fixed number of elements, e.g., 10, per subset, where the fixed number of elements in a subset is displayed at a time. If the number of objects in a last subset of the elements is less than some number less than the fixed number, then the elements in that last subset may be appended to the next to last subset of elements. For instance, if there are fewer than six records in the last subset, in the set, then those records are appended to the previous displayable subset. For example, if there are 22 elements, then there may be two subsets, one with 10 records and a second with 12.

Figure 5:
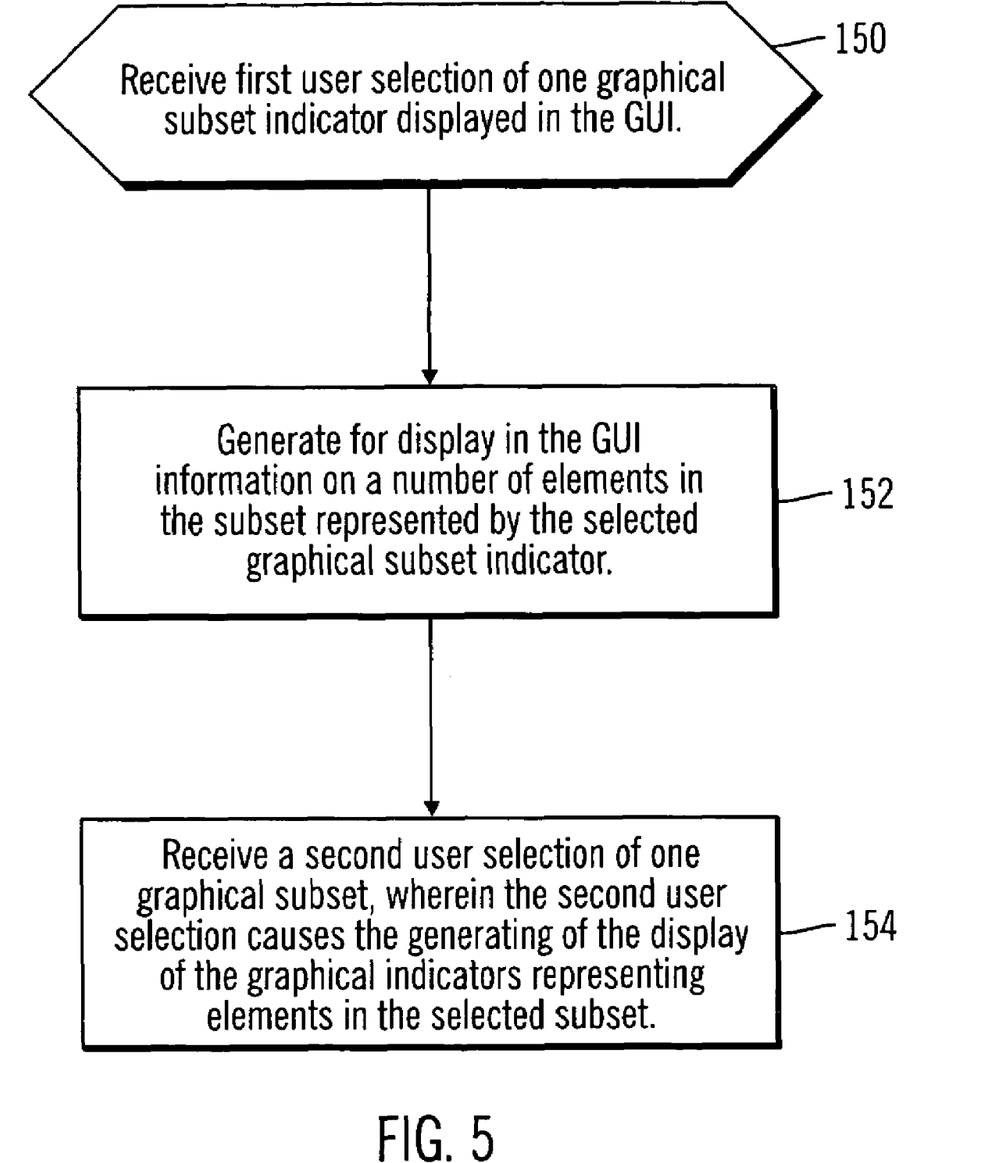

FIG. 5 illustrates operations performed by the object explorer 8 to change the displayed information in response to user selection of graphical indicators, e.g., dots, in the graphical paging control. Upon receiving (at block 150) a first user selection, via the input device 22, of one graphical subset indicator displayed in the tree view 10 presented in the GUI 16, the object explorer 8 generates (at block 152) for display in the GUI 16 information on a number of elements in the subset represented by the selected graphical subset indicator, such as the number range 70 in FIG. 3 showing the number of elements in the range. The information displayed for the selected subset may describe an attribute of the selected objects, such as a file number for some sorting criteria used for the objects, date, type, name, etc. The object explorer 8 then receives (at block 154) a second user selection of one graphical subset indicator, wherein the second user selection causes the generating the display of the graphical indicators representing elements in the selected subset. In one embodiment, the first user selection of one graphical subset indicator may comprise the user locating a graphical pointer in a defined selection area of the selected graphical subset indicator, such as by the user using the input device 22 to position the graphical pointer 46 (FIG. 2) over a graphical dot representing a subset of objects at the hierarchical level. Further, the second user selection of one graphical subset indicator may comprise the user performing a selection operation, e.g., double clicking a mouse input device, while the graphical pointer is located in the defined selection area of the selected graphical subset area. The defined selection area of a displayed graphic comprises the area of the GUI including the displayed graphic and may also include some perimeter of the GUI surrounding the displayed graphic.

Figure 6:
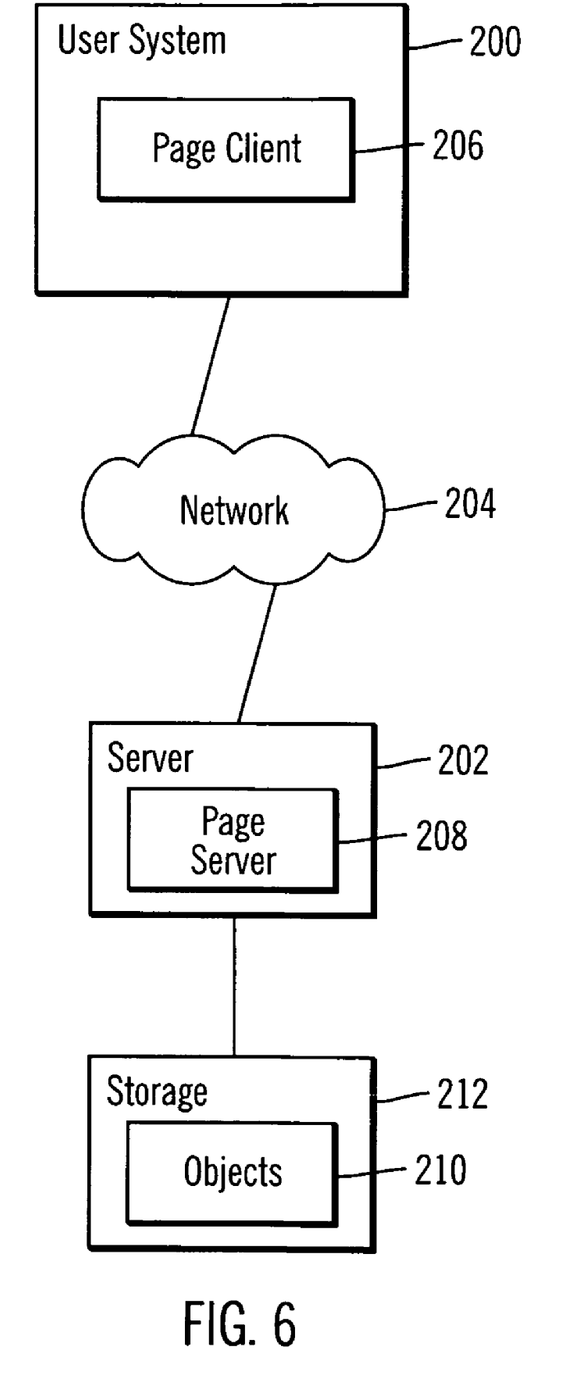
FIG. 6 illustrates an embodiment of a network computing environment.

FIG. 6 illustrates an additional network computing embodiment where a user system 200 is coupled to a server 202 over a network 204. The network 204 may comprise one or more networks known in the art, such as a Wide Area Network (WAN), Local Area Network (LAN), Storage Area Network (SAN), wireless network, the Internet, and Intranet, etc. The user system 200 includes a page client 206 that enables the user of the system 200 to request and display tree view pages in a GUI in which the user may select folders and objects. In one embodiment, the page client 106 may comprise a browser program, such as a Hypertext Markup Language (HTML) or web browser. Selection of objects in a graphical page control would cause the page client 206 to transmit a request for the selected objects to the server 202. The server 202 includes a page server 208 which responds to requests from the page client 206. The page server 208 may generate the tree view page in response to a request from the page client 206 and transmit the tree view page and any selected objects 210 in server storage 212 to the user system 200. The page client 206 and server 208 may implement a network transmission protocol, such as the Hypertext Transfer Protocol (HTTP), etc.

Figure 7:
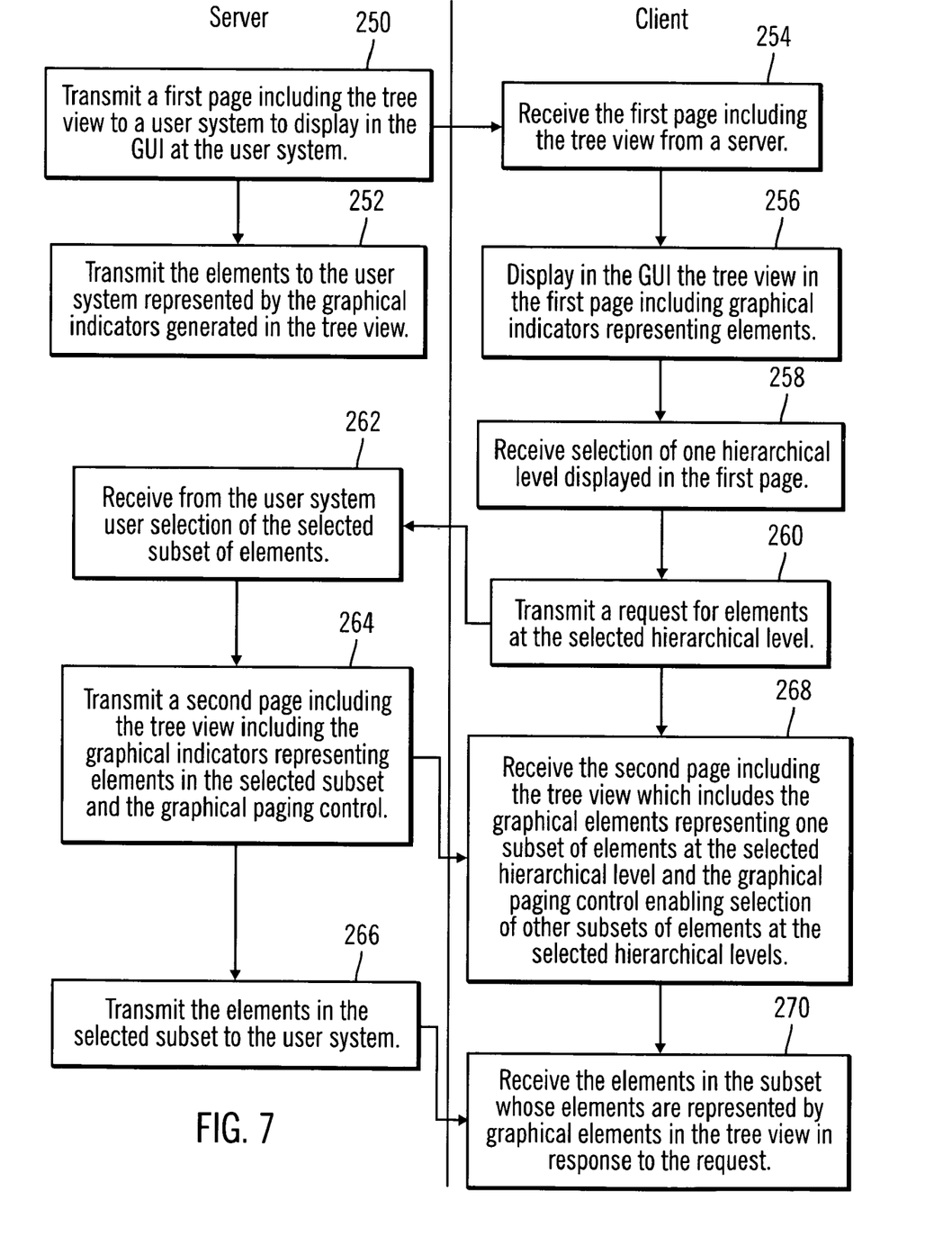
FIG. 7 illustrates an embodiment of operations to generate an use a tree view in a network computing environment.

FIG. 7 illustrates operations implemented in the page client 206 (client side) and page server 208 (server side) to transmit objects and tree view pages over the network 204 when the objects the user system 200 requests are distributed in the network 204. Control begins at block 250 with the page server 208 transmitting a first page including the tree view to a user system 200 to display in the GUI at the user system 200. The page server 208 further transmits (at block 252) the elements, e.g., objects 210, to the user system represented by the graphical indicators generated in the tree view. The page client 206 receives (at block 254) the first page including the tree view from page server 208, as well as any transmitted objects, and displays (at block 256) in the GUI the tree view in the first page including graphical indicators representing elements, e.g., the page or folder icons. The page client 206 receives (at block 258) user selection of one hierarchical level, e.g., folder 36, 38 (FIG. 2), displayed in the first page 30 and then transmits (at block 260) a request for elements at the selected hierarchical level to the server 202.

In response to receiving (at block 262) from the user system 200 user selection of the selected subset of elements, the page server 208 transmits (at block 264) a second page including the tree view which includes the graphical indicators representing elements in the selected subset and the graphical paging control. The page server 208 further transmits (at block 266) the elements, e.g., objects, in the selected subset to the user system 200. For instance, if the user selected folder 66 in FIG. 3, the page server 208 would return the page view 60 showing the elements in the hierarchical level represented by the folder 66 and graphical indicators of the first subset of objects in the selected folder 66 and graphical paging control 62. The page client 206 receives (at block 268) the second page including the tree view including the graphical elements representing one subset of elements at the selected hierarchical level and the graphical paging control enabling selection of other subsets of elements at the selected hierarchical levels. The page client 206 further receives (at block 270) any transmitted elements in the requested subset whose elements are represented by graphical elements in the tree view.

With certain described embodiments, the tree view only displays a subset of objects at a particular level and a graphical paging control allowing the user to page through different subsets of objects at the hierarchical level. Further, with certain described embodiments, the user system only accesses from storage, which may be a local or network storage, those objects represented in the displayed tree view. Objects may be incrementally accessed from storage when selecting a new hierarchical level or a different subset of objects through the paging control at a hierarchical level.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The illustrated operations of FIGS. 4, 5, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

processing hierarchical information including information on elements at different hierarchical levels;

generating a tree view in response to processing the hierarchical information enabled to be displayed in a graphical user interface (GUI) including graphical indicators representing elements at different hierarchical levels;

generating in the tree view for a plurality of hierarchical levels:

graphical indicators for a subset of the elements at the hierarchical level; and a graphical paging control comprising a plurality of graphical subset indicators representing subsets of elements for the hierarchical level, wherein each of the subsets groups objects according to an attribute of the objects to form a range of the objects grouping objects according to the attribute, wherein at least one of the subsets represented by the graphical subset indicators comprises a range of the objects non-consecutive with respect to a range of a subset of objects displayed in the tree view for the hierarchical level, wherein selection of one of the graphical subset indicators selects the subset of elements represented by the selected graphical subset indicator at the hierarchical level;

generating in the tree view graphical indicators representing elements in a selected subset of elements within the hierarchical levels generated in the tree view in response to selection of the graphical subset indicator representing the selected subset through the graphical paging control; and concurrently displaying in the tree view in one tree view page graphical indicators for elements in selected subsets of at least two hierarchical levels and the graphical paging controls for the at least two hierarchical levels.

2. The method of claim 1, wherein generating the graphical indicators representing elements in the selected subset causes the display in the GUI of graphical indicators representing elements in the selected subset and not elements in other subsets at the hierarchical level including the selected subset.

3. The method of claim 1, wherein generating the graphical indicators for the selected subset for display in the GUI does not affect the display in the GUI of graphical indicators representing elements displayed at hierarchical levels other than the hierarchical level including the selected subset.

4. The method of claim 1, wherein the graphical paging control are displayed within the displayed hierarchical level in the tree view for which the graphical paging control is generated, and wherein the graphical subset indicators comprise selectable dots displayed within the graphical paging control.

5. The method of claim 1, further comprising:
receiving user selection of one graphical subset indicator displayed in the GUI; and
generating for display in the GUI information on a number of elements in the subset represented by the selected graphical subset indicator.

6. The method of claim 5, wherein the user selection comprises a first user selection to display information on the number of elements, further comprising:
receiving a second user selection of one graphical subset indicator, wherein the second user selection causes the generating of the display of the graphical indicators representing elements in the selected subset.

7. The method of claim 6, wherein the first user selection of one graphical subset indicator comprises the user locating a graphical pointer in a defined selection area of the selected graphical subset indicator and wherein the second user selection of one graphical subset indicator comprises the user performing a selection operation while the graphical pointer is located in the defined selection area of the selected graphical subset area.

8. The method of claim 1, wherein the elements comprise groups and objects, wherein groups and objects at one hierarchical level below a first hierarchical level are included within one group at a higher hierarchical level, and wherein the graphical indicators representing groups are displayed as a folder icon.

9. The method of claim 1, further comprising:
transmitting a first page including the tree view to a user system to display in the GUI at the user system;
receiving from the user system user selection of one of the graphical subset indicators in one of the graphical paging controls to select one of the subsets of elements;
transmitting a second page including the tree view including the graphical indicators representing elements in the selected subset and the graphical paging control; and
transmitting the elements in the selected subset to the user system.

10. The method of claim 1, further comprising:
receiving a first page including the tree view from a server;
displaying in the GUI the tree view in the first page including the graphical indicators representing elements;
selecting one hierarchical level displayed in the first page;
transmitting a request for elements at the selected hierarchical level;
receiving a second page including the tree view including the graphical elements representing one subset of elements at the selected hierarchical level and the graphical paging control enabling selection of other subsets of elements at the selected hierarchical levels; and
receiving the elements in the subset whose elements are represented by graphical elements in the tree view in response to the request.

11. The method of claim 1, wherein the graphical paging controls are displayed within the displayed hierarchical levels in the tree view page for which the graphical paging controls are generated.

* * * * *